(12) United States Patent
Gammon

(10) Patent No.: US 7,654,503 B2
(45) Date of Patent: Feb. 2, 2010

(54) PILOT VALVE

(76) Inventor: James H. Gammon, 1544 Logan Dr., Manasquan, NJ (US) 08736

( * ) Notice: Subject to any disclaimer, the term of this patent is extended or adjusted under 35 U.S.C. 154(b) by 301 days.

(21) Appl. No.: 11/670,094

(22) Filed: Feb. 1, 2007

(65) Prior Publication Data
US 2008/0048141 A1 Feb. 28, 2008

Related U.S. Application Data

(60) Provisional application No. 60/839,477, filed on Aug. 23, 2006.

(51) Int. Cl.
*F16K 31/12* (2006.01)
(52) U.S. Cl. .................................. 251/26; 251/25
(58) Field of Classification Search ............ 251/25, 251/26, 333; 137/607
See application file for complete search history.

(56) References Cited

U.S. PATENT DOCUMENTS

| | | | |
|---|---|---|---|
| 2,744,719 A | 5/1956 | McRae | |
| 4,376,444 A * | 3/1983 | Michael | 137/1 |
| 4,482,127 A | 11/1984 | Hafele | |
| 4,615,354 A | 10/1986 | Bianchi | |
| 4,715,578 A * | 12/1987 | Seltzer | 251/25 |
| 4,981,280 A | 1/1991 | Brandenberg | |
| 5,301,919 A | 4/1994 | May | |
| 5,520,366 A | 5/1996 | Elliott | |
| 5,927,257 A * | 7/1999 | Hackett | 123/568.26 |
| 6,039,071 A * | 3/2000 | Tomita et al. | 137/505.37 |
| 6,945,507 B2 | 9/2005 | Baarda et al. | |

* cited by examiner

*Primary Examiner*—John K Fristoe, Jr.
(74) *Attorney, Agent, or Firm*—Fraser Clemens Martin & Miller LLC; Donald R. Fraser

(57) ABSTRACT

A valve assembly is disclosed that includes a main valve, a pilot valve, and means providing fluid communication between the main valve and the pilot valve. The main valve includes an inlet, outlet, and means adapted to selectively open and close fluid flow between the inlet and the outlet. The pilot valve includes a housing having a first port, a second port, and a third port, and a piston disposed within the housing. The piston cooperates with the housing and the means providing fluid communication to selectively establish fluid communication between the first port of the pilot valve and one of the inlet and the outlet of the main valve.

16 Claims, 4 Drawing Sheets

PILOT VALVE

CROSS-REFERENCE TO RELATED APPLICATION

This application claims the benefit of U.S. Provisional Patent Application Ser. No. 60/839,477 filed on Aug. 23, 2006.

FIELD OF THE INVENTION

The invention relates to a valves to control the flow of a fluid and more particularly to pilot valves employed to control larger valves which regulate the pressure and flow of a fluid in a system.

BACKGROUND OF THE INVENTION

Control valves are designed to operate at a specific fluid pressure, flow rate, or other condition to protect elements of the system from pressure, flow rate, or other fluid condition that exceeds the design limits thereof. When a condition that exceeds the design limits is sensed, a pilot valve directs a main control valve to either open or close, partially or fully, to alleviate the conditions therein. Such use of pilot valves to direct main control valves is well known in the prior art. U.S. Pat. Nos. 6,945,507, 5,520,366, and 4,615,354 are exemplary of pilot valves incorporating the features of the prior art.

Pilot valves are typically smaller valves than the main control valves and can be separate from or integral with the main control valves. The pilot valves are designed to sense a specific condition and guide the main control valve. The main control valve may operate by opening or closing to control the specific condition. This is done to protect components from excessive pressure or flow rate, or other conditions that exceed the limitation of components or of the fluid itself. This includes, but is not limited to the controlling of vacuum, differential pressure, contaminant levels, and mixing of different fluids.

The main control valve must respond quickly to the sensed fluid condition to protect the elements of the system. Fast response time in a main control valve requires the related pilot valve to be able to respond quickly. The longer the response time of the pilot valve, the longer the undesirable fluid condition will be maintained within the system.

It would be desirable to have a pilot valve for guiding a main control valve, wherein a response time of the pilot valve is minimized.

SUMMARY OF THE INVENTION

Compatible and attuned with the present invention, a pilot valve for guiding a main control valve wherein a response time of the pilot valve is minimized has surprisingly been discovered.

In one embodiment, a valve assembly comprises a main valve including a valve body having an inlet, outlet, and means adapted to selectively open and close fluid flow between the inlet and the outlet; a pilot valve including a housing having a first port, a second port, and a third port, and a piston disposed within the housing to selectively establish fluid communication between the first port of the pilot valve and one of the inlet and the outlet of the main valve; and means providing fluid communication between: the first port of the housing of the pilot valve and the means adapted to selectively open and close fluid flow between the inlet and the outlet of the main valve; the second port of the housing and one of the inlet and the outlet of the main valve; and the third port of the housing and one of the inlet and the outlet of the main valve.

BRIEF DESCRIPTION OF THE DRAWINGS

The above, as well as other objects and advantages of the invention will become manifest to those skilled in the art from reading the following detailed description of the preferred embodiment of the invention when considered in the light of the accompanying drawings, in which.

DETAILED DESCRIPTION OF THE PREFERRED EMBODIMENT OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
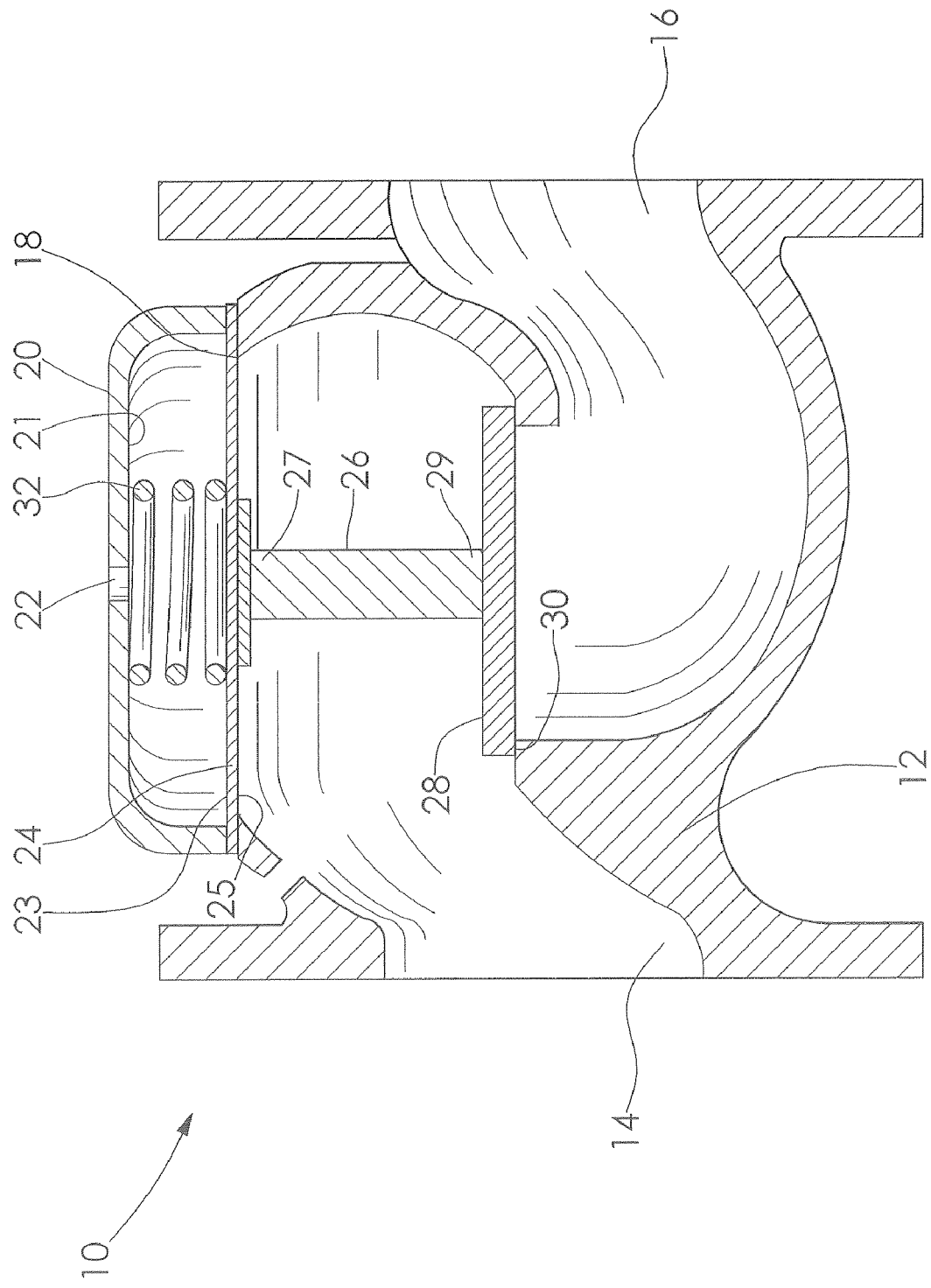
FIG. 1 is an elevational sectional view of a typical control valve of the diaphragm type shown in a closed

Referring to the drawings, there is illustrated in FIG. 1 a typical control valve 10 in the normally closed position. The illustrated control valve 10 is depicted as a diaphragm type. It must be understood that the function is substantially identical to the function of a piston or poppet type valve. Fluid flow may be in either direction. In the illustrated embodiment, the flow of fluid is from left to right, as indicated.

The control valve 10 has a main body 12 with a main fluid flow path therethrough. The flow path has an inlet side 14 and an outlet side 16. An aperture 18 is formed in an upper surface of the main body 12. A bonnet 20 is attached to the upper surface of the main body 12 covering the aperture 18. The bonnet 20 includes a port 22 in an upper portion thereof. A diaphragm 24 is disposed across the aperture 18 in the main body 12 and secured between the main body 12 and the bonnet 20. The diaphragm 24 is mounted on one end 27 of a shaft 26. The shaft 26 extends downwardly into the main flow path of the main body 12. A valve disk 28 is mounted on a spaced apart opposite end 29 of the shaft 26. The shaft 26 and valve disk 28 form a valve assembly adapted to cooperate with a valve disk seat 30 to form a substantially fluid tight seal therebetween when the valve disk 28 is in contact with the valve disk seat 30. A spring 32 is disposed between a top surface 23 of the diaphragm 24 and a facing inner-surface 21 of the bonnet 20. The diaphragm 24, bonnet 20, and spring 32 form a control device adapted to selectively position the valve in an open or a closed position. The spring 32 is in compression and normally urges the diaphragm 24 downwardly causing the valve disk 28 to contact the valve disk seat 30, positioning the valve assembly in a closed position.

In the closed position, the pressure at the inlet 14 is higher than the pressure at the outlet 16. The inlet pressure is applied to a bottom surface 25 of the diaphragm 24 tending to force the diaphragm 24 upwardly. Simultaneously, the inlet pressure is applied to the valve disk 28 tending to force the valve disk 28 downwardly. To keep the valve 10 closed, it is necessary to direct the inlet pressure to the top surface 23 of the diaphragm 24. In this way, the pressure on the top surface 23 and bottom surface 25 of the diaphragm 24 cancel one another and the valve disk 28 is closed against the valve disk seat 30 by the combination of the bias of the spring 32 and the fluid pressure acting on the valve disk 28.

The valve 10 will be caused to be opened when the pressure on the top surface 23 of the diaphragm 24 is lower than the pressure at the inlet 14. Such a condition is typically achieved by effecting communication between the port 22 in the bonnet 20 and the outlet 16. When such a condition exists, the diaphragm 24 is forced upwardly against the bias of the spring 32 and the outlet pressure acting against the top surface 23 of the diaphragm 24.

Typically, a pilot valve may be employed to control the relationship between the pressure on the top surface 23 of the diaphragm 24 and the pressure on the bottom surface 25 of the diaphragm 24. Accordingly, the passage of a fluid from the inlet 14 to the outlet 16 of the valve 10 may he controlled.

The present invention is designed to provide a rapid closing or opening of the control valve 10. The rapid closing or opening minimizes the Lime during which components within a fluid flow system are exposed to undesired flow conditions.

Figure 2:
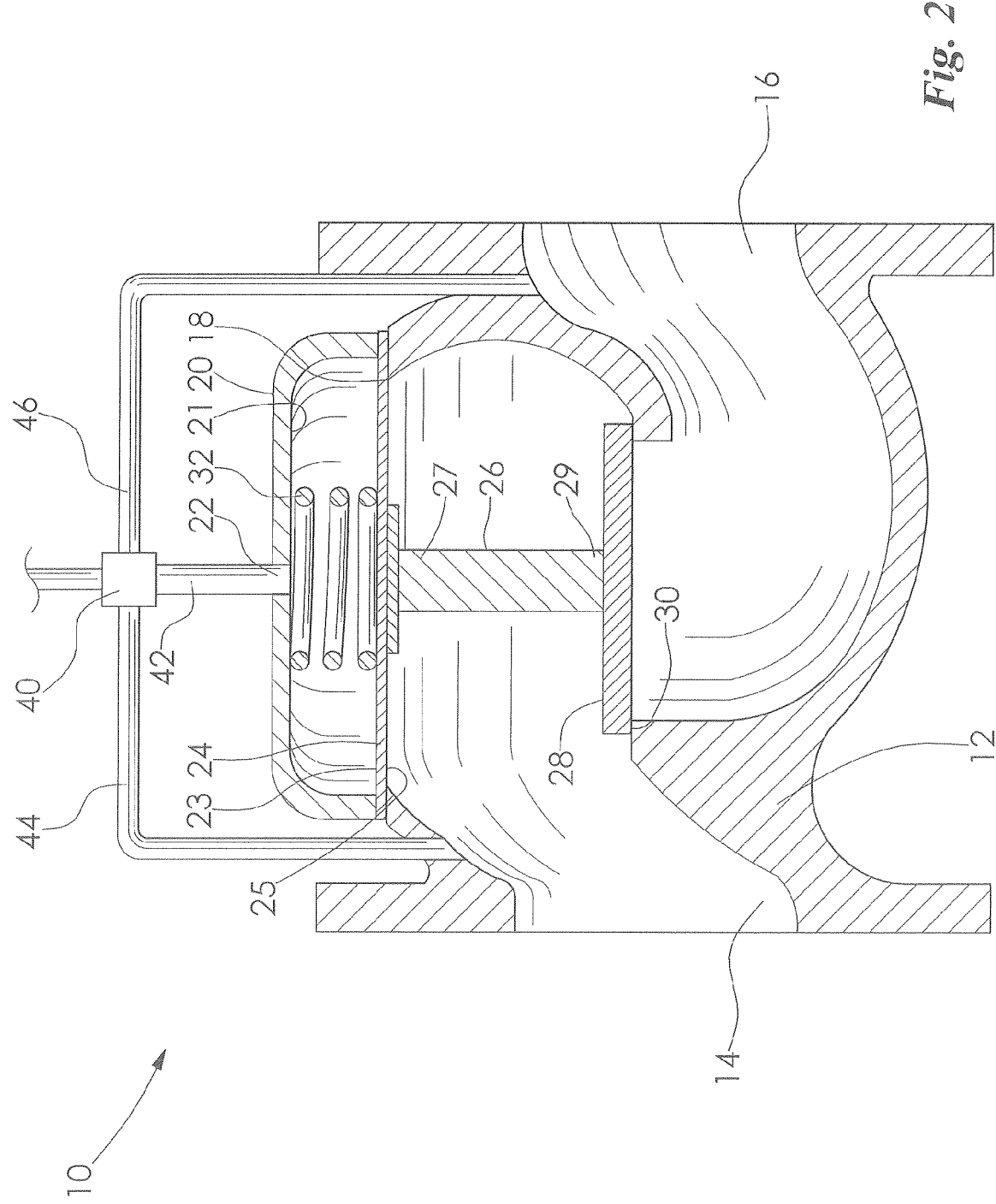
FIG. 2 is a sectional view of the valve illustrated in FIG. 1 with a schematic view of a pilot valve incorporating the features of the present attached thereto.

Referring now to FIG. 2, there is illustrated a 3-way pilot valve 40 connected to the valve 10 illustrated in FIG. 1. The pilot valve 40 communicates with the surface 23 of the diaphragm 24 through a first conduit 42; with the inlet 14 of the valve 10 through a second conduit 44; and with the outlet 16 of the valve 10 through a third conduit 46. It should be understood that the second conduit 44 and the third conduit 46 can be reversed. When reversed, the second conduit 44 is in communication with the outlet 16 of the valve 10 and the third conduit 46 in communication with the inlet 14 of the valve 10.

Figure 3:
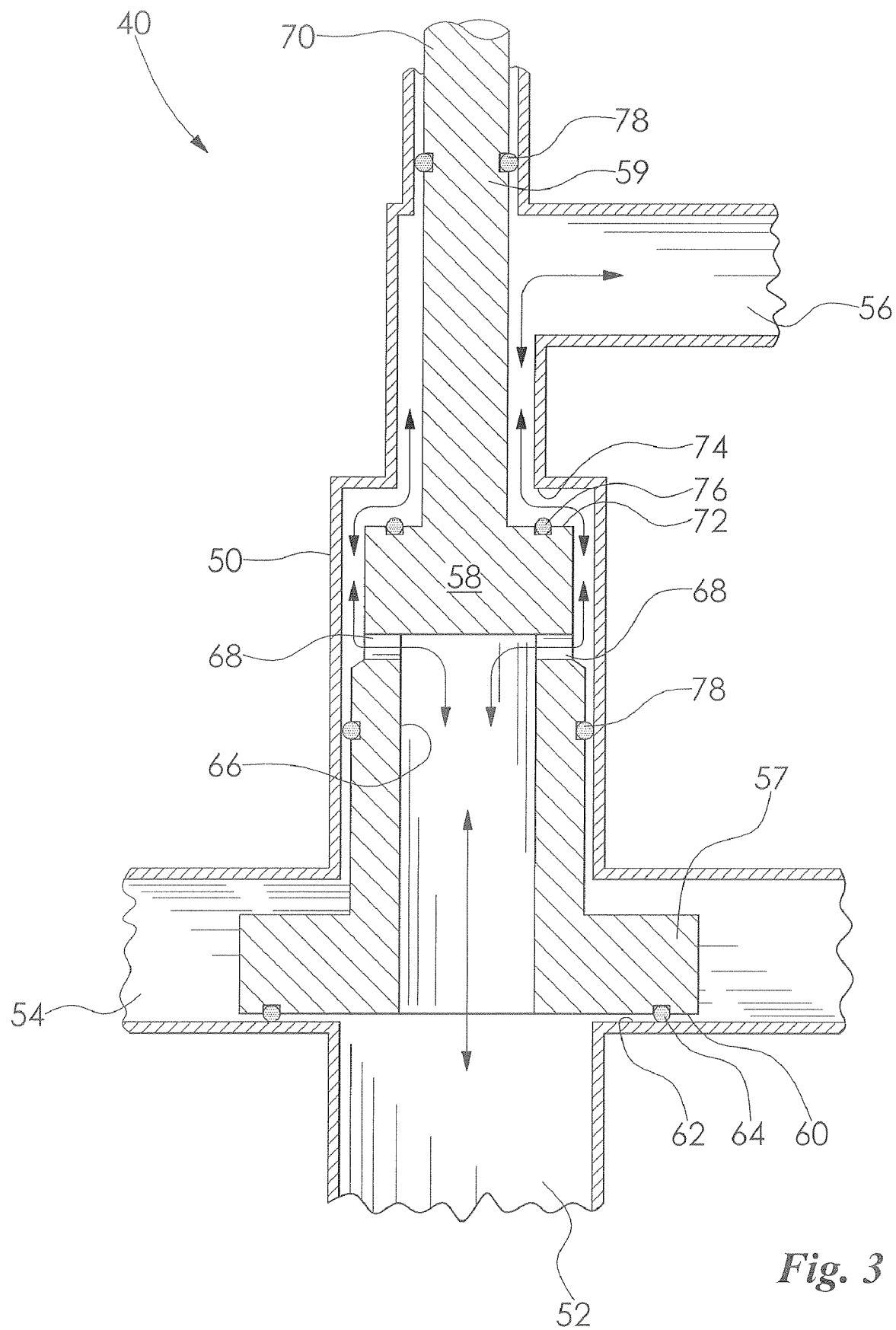
FIG. 3 is an enlarged fragmentary sectional view of the pilot valve illustrated in FIG. 2 showing the structural aspects of the invention with the pilot valve in a position wherein the control valve is maintained in an open position.

FIG. 3 illustrates the basic structure of the 3-way pilot valve 40 embodying the concepts and structure of the invention. More specifically, the pilot valve 40 comprises an outer housing 50 including a first port 52 providing communication with the diaphragm 24 of the valve 10 through the conduit 42; a second port 54 providing communication with the inlet 14 of the valve 10 through the conduit 44; and a third port 56 providing communication with outlet 16 of the valve 10 through the conduit 46. It should be understood that the communication of the second port 54 and the third port 56 can he reversed. When reversed, the second port 54 is in communication with the outlet 16 of the valve 10 and the third port 56 in communication with the inlet 16 of the valve 10.

A piston 58 is disposed within the outer housing 50 and adapted to reciprocate therein. The piston 58 has a first end 59 including an operating shaft 70 adapted to project outwardly of the housing 50. The operating shaft 70 is in communication with an operator (not shown), the operator being adapted to selectively position the piston 58 within the outer housing 50.

The piston 58 includes a first valve disk 72 for selectively sealing against a first valve seat 74 on an inner-surface of the outer housing 50. The first valve disk 72 includes a sealing member 76 typically disposed within an annular groove, for example. The sealing member 76 facilitates the formation of a substantially fluid tight seal between the first valve disk 72 and the first valve seat 74. It should be understood that the sealing member 16 can be an o-ring or otherwise shaped, as desired.

The piston 58 has a second end 57 including a second valve disk 60 for selectively sealing against a second valve seat 62. The second valve seat 62 is disposed on an inside surface of the housing 50 and circumscribes the first port 52. The second valve disk 60 includes a sealing member 64 typically disposed within an annular groove and having a sealing surface protruding therefrom for example. The sealing member 64 facilitates the formation of substantially fluid tight face seal between the second valve disk 60 and the second valve seat 62. It should be understood that the sealing member can be one of a rectangular, square, circular, or other cross sectional shape as desired. An outer perimeter of the sealing member 64 defines a face seal area. The face seal area is greater than a cross sectional area of the first port 52.

An internal bore 66 is formed in the second end 57 of the piston 58. The bore 66 includes at least one aperture 68 which extends through the wall of the piston 58 at the nearer end of the bore 66. The bore 66 and the aperture 68 cooperate to provide a fluid flow path through the piston 58.

The piston 58 includes at least one sealing member 78 disposed at a selected position on an outer surface of the piston 58. The sealing member 78 cooperates with the piston 58 and outer housing 50 to facilitate a reciprocating motion of the piston 58 within the housing 50 and the formation of a substantially fluid tight seal between the piston 58 and the outer housing 50. It should be understood that the sealing member 78 can be an o-ring or otherwise shaped as desired.

In operation, the pilot valve 40 can be mounted to a control valve 10. The control valve 10 can be either normally open or normally closed. The control valve 10 shown in FIG. 1 and 2 is a normally closed control valve. In FIG. 3 the pilot valve 40 is shown in a position wherein the associated normally closed control valve 10 is maintained in an open position In this position, the second port 54 is in communication with the inlet 14 (high pressure side) of the control valve 10 and the third port 56 is in communication with the outlet 16 (low pressure side) of the control valve 10. The piston 58 is positioned by the operator (not shown) downwardly causing the second sealing member 64 to contact the second valve seat 62 forming a substantially fluid tight seal therebetween and preventing fluid communication between the first port 52 and the second port 54. Further, the bore 66 and the apertures 68 of the piston 54 cooperate with the housing 50 to place the first port 52 in fluid communication with the third port 56. The low pressure associated with the third port 56 is provided to the top surface 23 of the diaphragm 24 of the control valve 10 causing the high pressure of the inlet 14 to urge the diaphragm 24 upwardly and maintain the control valve 10 in the open position.

Figure 4:
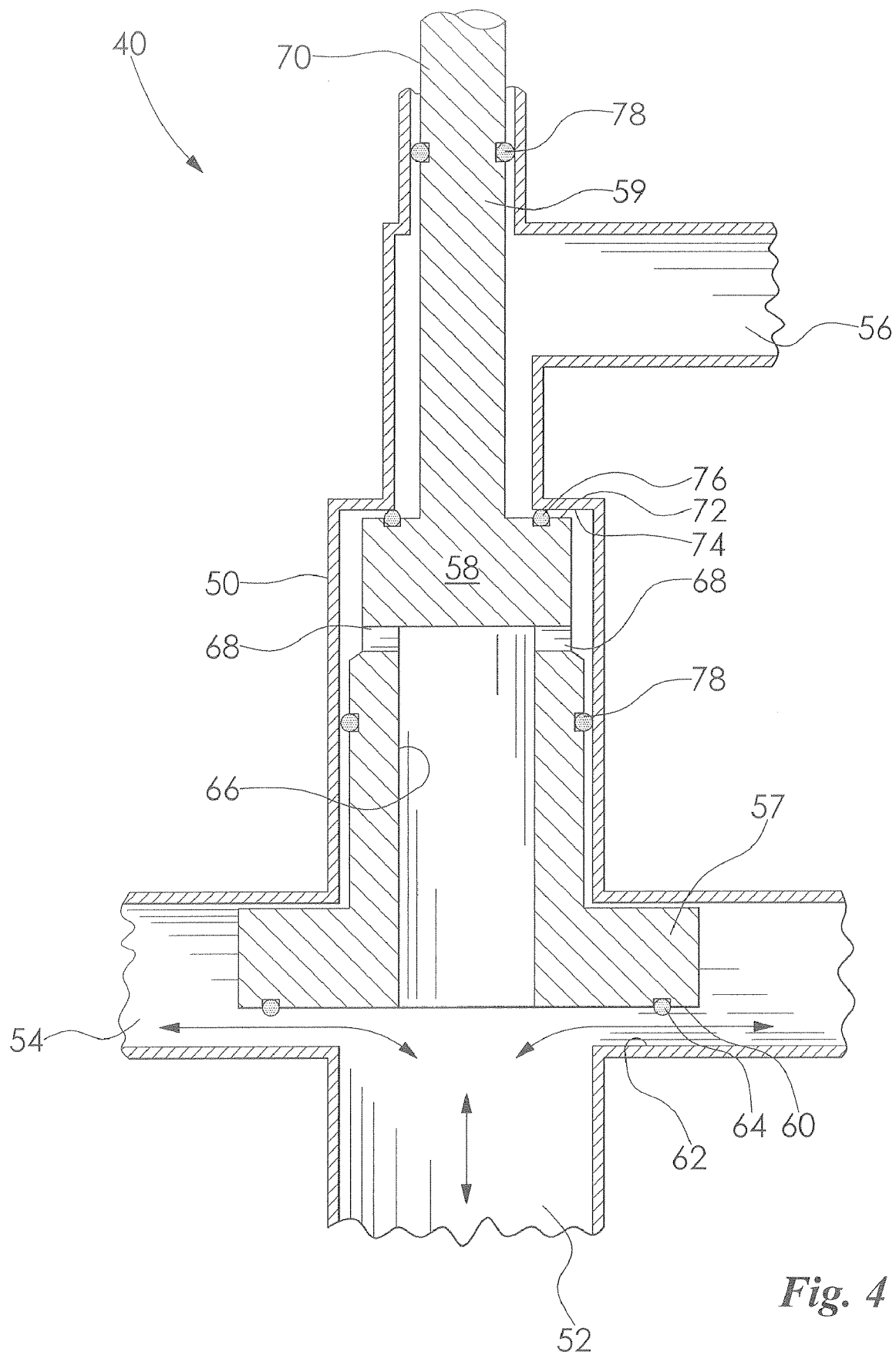
FIG. 4 is an enlarged fragmentary sectional view of the pilot valve illustrated in FIG. 3 showing the structural aspects of the invention with the pilot valve in a position wherein the control valve is maintained in a closed position.

The pilot valve 40 can also be employed to close the control valve 10. FIG. 4 shows the pilot valve 40 in a position wherein the associated control valve 10 is maintained in a closed position. To close the control valve 10, the piston 58 is moved upwardly by the operator (not shown) causing the first sealing member 76 to contact the first valve seat 74 and form a substantially fluid tight seal therebetween. In this position the first port 52 is in fluid communication with the second port 54. The high pressure associated with the second port 54 is provided to the top surface 23 of the diaphragm 24 of the control valve 10 causing the high pressure of the inlet 14 acting against the bottom surface 25 of the diaphragm 24 to be cancelled, resulting in the closing of the control valve 10 by the combination of the spring 32 and force acting downwardly on the valve disk 28.

The pilot valve 40 is adapted to rapidly close the control valve 10 when moved to the position shown in FIG. 4. The maximized diameter of the first port 52 combined with the face seal of the second valve disk 60 to the second valve seat 62 enables a maximized flow path to open between the first port 52 and the second port 54 upon a minimal upward travel of the piston 58. This provides a maximized transfer rate of the high pressure fluid from the second port 54 to the first port 52 and the top surface 23 of the diaphragm 24 of the control valve 10, resulting in a minimized closing time of the control valve 10.

The pilot valve 40 can also be utilized to provide a minimized opening time to the control valve 10. The minimized opening time would be achieved by reversing the second port 54 and third port 56 connections; namely, placing the second port 54 in communication with the outlet 16 (low pressure) of the control valve 10 and the third port 56 in communication with the inlet 14 of the control valve 10. Further, by utilizing control valves that are either normally closed or normally open along with selectively providing high pressure and low pressure communication to the second port 54 and the third port 56, a plurality of control valve assemblies can be achieved to provide minimized closing and opening times as desired.

Further, it should be understood that the illustrated embodiments disclose the pilot valve 40 of the invention being employed to control a diaphragm control valve 10, the pilot valve 40 can be utilized equally beneficially with a control valve of the piston type.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A valve assembly comprising:
   a main valve including a valve body having an inlet, outlet, and means adapted to selectively open and close fluid flow between the inlet and the outlet;
   a pilot valve including a housing having a first port, a second port, and a third port, a valve seat formed on the housing circumscribing the first port, and a first piston having a first end and a second end disposed within the housing, the first piston including a valve disk formed on the second end thereof, the valve disk and the valve seat forming a substantially fluid tight seal when in contact with one another to selectively establish fluid communication between the first port of the pilot valve and one of the second port and the third port of the pilot valve;
   a first conduit providing fluid communication between the first port of the housing of the pilot valve and the means adapted to selectively open and close fluid flow between the inlet and the outlet of the main valve;
   a second conduit providing fluid communication between the second port of the housing and one of the inlet and the outlet of the main valve; and
   a third conduit providing fluid communication between the third port of the housing and one of the inlet and the outlet of the main valve, wherein fluid communication between the main valve and the pilot valve is employed to cause a movement of the first piston within the housing of the pilot valve and an associated opening and closing of fluid flow between the inlet and the outlet of the main valve.

2. The valve assembly according to claim 1, wherein the means adapted to selectively open and close fluid flow between the inlet and the outlet of the main valve includes a diaphragm.

3. The valve assembly according to claim 1, wherein the means adapted to selectively open and close fluid flow between the inlet and the outlet of the main valve includes a second piston.

4. The valve assembly according to claim 1, including a shaft extending from the first end of the first piston out of the housing.

5. The valve assembly according to claim 4, including an operator in communication with the shaft of the first piston to selectively position the first piston within the housing.

6. The valve assembly according to claim 1, including a sealing member disposed on the valve disk formed on the second end of the first piston to facilitate the formation of the substantially fluid tight seal with the valve seat circumscribing the first port.

7. The valve assembly according to claim 6, wherein an outer perimeter of the sealing member defines a face seal area having a greater area than a cross sectional area of the first port.

8. The valve assembly according to claim 6, wherein the sealing member has one of a square, rectangular, and circular cross sectional shape.

9. The valve assembly according to claim 1, including at least one sealing member disposed on an outer surface of the first piston, the sealing member facilitating a reciprocating motion of the first piston in respect of the housing and the formation of a substantially fluid tight seal between the outer surface of the first piston and the housing.

10. The valve assembly according to claim 1, including an internal bore formed in the second end of the first piston with at least one aperture through a wall of the first piston, the bore and the aperture providing a fluid flow path through the first piston.

11. A pilot valve for opening and closing a main valve comprising:
   a housing having a first port in fluid communication with means to selectively open and close the main valve, a second port in fluid communication with one of an inlet and an outlet of the main valve, a third port in fluid communication with one of the inlet and the outlet of the main valve, a first valve seat formed on the housing adjacent the third port, and a second valve seat formed on the housing circumscribing the first port;
   a piston having a first end and a second end reciprocatively disposed within the housing, the piston including a first valve disk formed on the piston adjacent the first end thereof and a second valve disk formed on the second end of the piston, the second valve disk and the second valve seat forming a substantially fluid tight seal when in contact with one another, an outer perimeter of the substantially fluid tight seal defining a face seal area having a greater area than a cross sectional area of the first port, wherein fluid communication between the main valve and the pilot valve is employed to cause a movement of the piston within the housing of the pilot valve and an associated opening and closing of fluid flow between the inlet and the outlet of the main valve.

12. The pilot valve according to claim 11, wherein the first valve disk and the first valve seat form a substantially fluid tight seal when in contact.

13. The pilot valve according to claim 12, including a sealing member disposed on the first valve disk to facilitate the formation of the substantially fluid tight seal with the first valve seat.

14. The valve assembly according to claim 11, including a sealing member disposed on the second valve disk to facilitate the formation of the substantially fluid tight seal with the second valve seat.

15. The valve assembly according to claim 11, including at least one sealing member disposed on an outer surface of the piston, the sealing member facilitating a reciprocating motion of the piston in respect of the housing and the formation of a substantially fluid tight seal between the outer surface of the piston and the housing.

16. The valve assembly according to claim 11, including an internal bore formed in the second end of the piston with at least one aperture through a wall of the piston, the bore and the aperture providing a fluid flow path through the piston.

* * * * *

UNITED STATES PATENT AND TRADEMARK OFFICE
CERTIFICATE OF CORRECTION

PATENT NO. : 7,654,503 B2  Page 1 of 1
APPLICATION NO. : 11/670094
DATED : February 2, 2010
INVENTOR(S) : James H. Gammon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this

Twenty-third Day of November, 2010

David J. Kappos
*Director of the United States Patent and Trademark Office*